United States Patent
Norton et al.

(10) Patent No.: US 11,257,165 B1
(45) Date of Patent: Feb. 22, 2022

(54) SYSTEMS AND METHODS FOR DEVELOPING POLICY ADMINISTRATION SYSTEMS BASED UPON FINITE STATE MACHINE MODELS

(71) Applicant: STATE FARM MUTUAL AUTOMOBILE INSURANCE COMPANY, Bloomington, IL (US)

(72) Inventors: Joseph W. Norton, Normal, IL (US); Venkata R. Kongara, Fairview, TX (US); Timothy J. Wheeler, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 271 days.

(21) Appl. No.: 16/702,625

(22) Filed: Dec. 4, 2019

Related U.S. Application Data

(63) Continuation of application No. 14/711,988, filed on May 14, 2015, now Pat. No. 10,535,102.
(Continued)

(51) Int. Cl.
*G06Q 40/08* (2012.01)
*G06Q 40/00* (2012.01)

(52) U.S. Cl.
CPC ............. *G06Q 40/08* (2013.01); *G06Q 40/00* (2013.01)

(58) Field of Classification Search
CPC ................................. G06Q 40/08; G06Q 40/00
See application file for complete search history.

(56) References Cited

U.S. PATENT DOCUMENTS

| | | | | |
|---|---|---|---|---|
| 2002/0082875 A1* | 6/2002 | Best-Devereux | ...... | G06Q 40/08 705/4 |
| 2004/0143464 A1* | 7/2004 | Houle | ................... | G06Q 10/10 705/4 |

FOREIGN PATENT DOCUMENTS

| | | | | |
|---|---|---|---|---|
| CN | 102770884 A | * | 11/2012 | ............. G06Q 40/08 |

OTHER PUBLICATIONS

Birny Birnbaum, Overview of Lender-Place Insurance Products, Markets and Issues, Jun. 13, 2013, Birny Birnbaum Consulting, Inc., web edition, 1-35 (Year: 2013).*
(Continued)

*Primary Examiner* — I Jung Liu
(74) *Attorney, Agent, or Firm* — Marshall, Gerstein & Borun LLP

(57) ABSTRACT

A new design strategy based upon finite state machine models is used to develop a policy administration system. The policy administration system comprises a plurality of finite state machined-based households, each of which is defined by a set of states represented by data that describe or relate to various policies associated with each household, a set of events represented by transactions that operate on the data, and/or a set of transition functions represented by transaction logics and/or product rules that govern how the transactions are processed. In this manner, each finite state machine-based household becomes a type of self-contained policy administration system that may be executed and managed concurrently. Each policy may be an insurance policy, such as an auto, home, life, renters, personal articles, or health insurance policy. Each finite state machine-based or virtual household may facilitate managing, updating, or generating insurance policies for the household and/or household members.

20 Claims, 7 Drawing Sheets

Related U.S. Application Data

(60) Provisional application No. 62/113,585, filed on Feb. 9, 2015.

(56) References Cited

OTHER PUBLICATIONS

Statefarm.Org, "Property-based testing of Stateful Systems," (2014). Retrieved from the Internet on Oct. 22, 2014: <https://lt00nxdt00500Q2.opr.statefarm.org/trac/TestArchTS/ticket/1754>.
Fitzgerald et al., "North American Policy Administration Systems 2013, Personal, Commercial, and Specialty ABCD Vendor View", Celent, 1-26 (2013).

* cited by examiner

SYSTEMS AND METHODS FOR DEVELOPING POLICY ADMINISTRATION SYSTEMS BASED UPON FINITE STATE MACHINE MODELS

CROSS-REFERENCE TO RELATED APPLICATIONS

This application is a continuation application of U.S. patent application Ser. No. 14/711,988, filed on May 14, 2015, and entitled "SYSTEMS AND METHODS FOR DEVELOPING POLICY ADMINISTRATION SYSTEMS BASED UPON FINITE STATE MACHINE MODELS," which claims benefit of the filing date of U.S. Provisional Patent Application 62/113,585, filed on Feb. 9, 2015, and entitled "SYSTEMS AND METHODS FOR DEVELOPING POLICY ADMINISTRATION SYSTEMS BASED UPON FINITE STATE MACHINES MODELS," the entire disclosures of which are hereby incorporated by reference herein.

FIELD OF THE DISCLOSURE

The present disclosure generally relates to policy administration systems, and more particularly, to systems and methods for developing policy administration systems based upon finite state machine models.

BACKGROUND

In the insurance field, a policy administration system is used to manage policies that an insurance company has written. A policy may be issued for any number of products or lines of business provided by the insurance company (e.g., vehicle insurance, home insurance, life insurance, etc.). Transactions made on the policy (e.g., changes to the policy such as renewal, cancellation, reinstatement, etc.) may be recorded and tracked by the policy administration system. In this regard, the policy administration system may act like a system of record for storing, organizing and maintaining various policy-related data generated by the insurance company.

Existing policy administration systems may be typically implemented as several monolithic systems, each of which is responsible for a product or line of business. While these separate monolithic systems may have access to some globally available data, the systems themselves are essentially isolated from one another. This makes the sharing of data and information between the systems difficult. As a result, during transactions, separate processing operations may be needed in order to determine the impact of the transactions on all the separate systems. This in turn may render the performance of many existing policy administration systems slow and/or inefficient.

SUMMARY

To improve system performance, policy administration systems may be designed and developed based upon finite state machine models. In this approach, instead of having separate monolithic systems, each and every insured household is modeled as a finite state machine. As a result, each household becomes a type of self-contained policy administration system that may be run and managed at the same time, thereby enabling the concurrent processing of insurance-related transactions in a fast, efficient and accurate manner.

In one aspect, a computer-implemented method for developing a policy administration system based upon finite state machine models may be provided. The method may include defining, by one or more processors executing a processor-implemented instruction module, the policy administration system to comprise a plurality of households insured by an insurance company. The plurality of households may include at least a portion of all households insured by the insurance company. The method may also include modeling, by the processor-implemented instruction module, each of the plurality of households as a finite state machine, wherein each of the plurality of households is defined by a (i) set of states, (ii) a set of events, and/or (iii) a set of transition functions. The method may further include defining, by the processor-implemented instruction module, data that describe or relate to one or more insurance policies issued by the insurance company for each household, the data corresponding to the set of states for each household. Further, the method may include receiving, by the processor-implemented instruction module, one or more transactions for each household that operate on the data of each household, the one or more transactions corresponding to the set of events for each household. Still further, the method may include processing, by the processor-implemented instruction module, the one or more transactions for each household according to one or more transaction logics and/or one or more product rules for each household, the one or more transaction logics and product rules corresponding to the set of transition functions for each household. Additionally, the method may include causing, by the processor-implemented instruction module, a state transition for each household as a result of processing the one or more transactions for each household. Insurance policies may be adjusted and/or insurance-related activities may be performed based upon the state transition for each household and/or current modeling of an individual insured household/family. The method may include additional, fewer, or alternate actions, including those discussed elsewhere herein.

In another aspect, a non-transitory computer-readable storage medium including computer-readable instruction to be executed on one or more processors of a system for developing a policy administration system based upon finite state machine models may be provided. The instructions when executed may cause the one or more processors to define, by a processor-implemented instruction module, the policy administration system to comprise a plurality of households insured by an insurance company. The plurality of households may include at least a portion of all households insured by the insurance company. The instructions when executed may also cause the one or more processors to model, by the processor-implemented instruction module, each of the plurality of households as a finite state machine, wherein each of the plurality of households is defined by a (i) set of states, (ii) a set of events, and/or (iii) a set of transition functions. The instructions when executed may further cause the one or more processors to define, by the processor-implemented instruction module, data that describe or relate to one or more insurance policies issued by the insurance company for each household, the data corresponding to the set of states for each household. Further, the instructions when executed may cause the one or more processors to receive, by the processor-implemented instruction module, one or more transactions for each household that operate on the data of each household, the one or more transactions corresponding to the set of events for each household. Still further, the instructions when executed may cause the one or more processors to process, by the processor-implemented instruction module, the one or more transactions for each household according to one or more transaction logics and/or one or more product rules for each household, the one or more transaction logics and product rules corresponding to the set of transition functions for each household. Additionally, the instructions when executed may cause the one or more processors to cause, by the processor-implemented instruction module, a state transition for each household as a result of processing the one or more transactions for each household. The instructions may also relate to managing, generating, and/or updating insurance policies for insured households based upon a current state of each household. The non-transitory computer-readable storage memory may include additional, fewer, or alternate computer-readable instructions, including those discussed elsewhere herein.

In another aspect, a computer system for developing a policy administration system based upon finite state machine models may be provided. The system may include a data repository and a server including a memory having instructions for execution on one or more processors. The instructions, when executed by the one or more processors, may cause the server to define, by one or more processors executing one or more processor-implemented instruction modules, the policy administration system to comprise a plurality of households insured by an insurance company. The plurality of households may include at least a portion of all households insured by the insurance company. The instructions, when executed by the one or more processors, may also cause the server to model, by the one or more processors executing one or more processor-implemented instruction modules, each of the plurality of households as a finite state machine, wherein each of the plurality of households is defined by a (i) set of states, (ii) a set of events, and/or (iii) a set of transition functions. The instructions, when executed by the one or more processors, may further cause the server to store, by the one or more processors executing one or more processor-implemented instruction modules, each household in the data repository. Further, the instructions, when executed by the one or more processors, may cause the server to define, by the one or more processors executing one or more processor-implemented instruction modules, data that describe or relate to one or more insurance policies issued by the insurance company for each household, the data corresponding to the set of states for each household. Still further, the instructions, when executed by the one or more processors, may cause the server to receive, via a network connection, one or more transactions for each household that operate on the data of each household, the one or more transactions corresponding to the set of events for each household. Moreover, the instructions, when executed by the one or more processors, may cause the server to process, by the one or more processors executing one or more processor-implemented instruction modules, the one or more transactions for each household according to one or more transaction logics and one or more product rules for each household, the one or more transaction logics and product rules corresponding to the set of transition functions for each household. Additionally, the instructions, when executed by the one or more processors, may cause the server to cause, by the one or more processors executing one or more processor-implemented instruction modules, a state transition for each household as a result of processing the one or more transactions for each household to facilitate managing and/or updating insurance policies. The computer system may include additional, fewer, or alternate instructions for execution on the one or more processors, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

There are shown in the drawings arrangements which are presently discussed, it being understood, however, that the present embodiments are not limited to the precise arrangements and instrumentalities shown, wherein.

Figure 1:
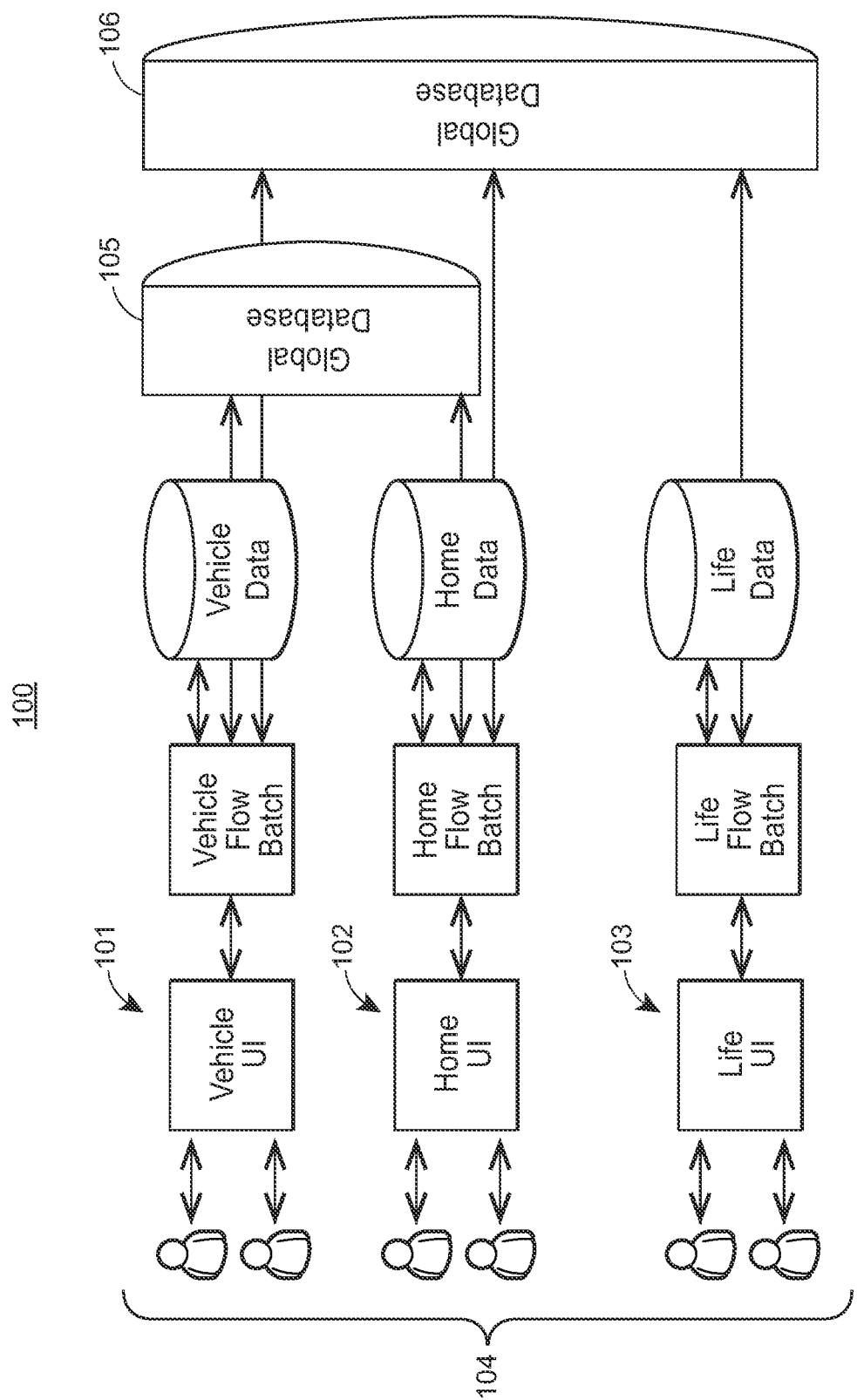
FIG. 1 is a block diagram of an exemplary prior art policy administration system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Insurance companies use policy administration systems for managing policies, maintaining data, and providing customer service. The systems and methods disclosed herein generally relate to, inter alia, the design and development of policy administration systems based upon finite state machine models. In particular, each insured household is modeled as a finite state machine. This allows each household to be fashioned as a type of self-contained policy administration system. Generally, a household may be and/or include a customer profile or portfolio, which in turn may be and/or include a comprehensive grouping of a primary or potential customer's accounts, policies, products, claims, billing accounts, billing information, etc.

Noted above, each household may be virtually modeled as a finite state machine. The finite state machine's state may be a composition of data, transaction logic, and product rule artifacts. As a whole, a policy administration system with households based upon finite state machine models may be able to process millions of transactions on a daily basis concurrently across a multitude of distributed sites, clusters and nodes. The term "batch processing" may have a similar meaning to the current state in that the processing of finite state machines that have events for the given day. The batch processing of a single finite state machine may be triggered as needed by external transactions, such as new business, policy changes, payments, and compliance changes and by internal transactions, such as policy renewals.

The data artifacts may be versioned and specific to a household. All data artifacts, except for documents and history, may be stored in a single container. From a logical perspective, the data artifacts of a single household and its corresponding policies may be partitioned into five broad areas: documents (DOC), work in progress (WIP), interim master records (IMR), master records (MR), and/or history of master records (HMR). The DOC contains immutable auxiliary and supporting documents. The WIP contains mutable bookkeeping data for staging, reviewing, underwriting, and/or servicing. The IMR contains a mutable interim master of records prior to finalization. The MR and HMR contain an immutable, finalized master of records and a history of immutable, finalized master of records, respectively. On an enterprise basis, the number of copies (not including any historical backups) may be equal to the number of active households times a configurable replication factor. Data typically may not require caching.

The transaction logic and product rule artifacts may be versioned, immutable, and/or enterprise global. On an enterprise basis, the number of copies may be equal to the number of active versions times the number of active servers. Transaction logic and product rules may be easily deployed and cached.

The decision to model each household as a finite state machine and to store its data locally simplifies the process of deploying and upgrading to new transaction logic and product rules. New transaction logic and product rules may be first tested and then pushed out to an enterprise. Next, individual households may be upgraded asynchronously as needed. For example, the trigger to upgrade may be done explicitly by a customer's request for new business or by a line of business's request for compliance reasons. The trigger to upgrade may also be done indirectly at the timing of a policy renewal and/or by an asynchronous background maintenance job.

The user portal and interface for customers to create, to view, and/or to manage their household's insurance policies may optionally be versioned, immutable, and/or enterprise global, similar to the transaction logic and product rule artifacts. Similarly, the user portal and interface for agents, underwriters, and operations staff may be treated in such a manner.

Households are not static and are fundamentally dynamic in nature just like household members. The members of a household may be naturally subject to planned and unplanned changes due to personal needs, family needs, life events, regulations, and/or laws. The data of a finite state machine that represents a single household supports a split operation that breaks a single household into two or more households and/or a merge operation that combines two or more households into a single household. Likewise, the transaction logic and product rule artifacts may be fundamentally dynamic in nature. The data of a finite state machine may support an upgrade operation and a downgrade operation to accommodate new and old versions of the data, transaction logic, and/or product rule artifacts. In addition to these four operations, the data of a finite state machine supports backup, restore, and/or health check operations.

In one embodiment, a future state machine for a single household may be based upon and/or employ transaction logic and/or product rules. The transaction logic may relate to individual insurance policy transactions and/or the mechanics of managing an insurance policy, such as checking and/or verifying an actual name, address, and/or vehicle information number (VIN); and/or verifying that a person, home, vehicle, and/or personal article actually exists. Additionally or alternatively, the transaction logic may relate to updating rates or coverages; cancelling policies; issuing polices; re-issuing policies; changing addresses or coverages (such as adding a driver to an auto insurance policy); determining whether a specified or new driver has any driving violations; etc. To verify data, the transaction logic may query and/or use products rules to check that certain pieces of customer information are correct.

The product rules may include insurance rules based upon type of coverage, such as motorcycle or auto rules, home rules, or individual rules. Additionally or alternatively, the product rules may be based upon state law, such as Iowa or Illinois state law. For instance, a change in Alabama law or rules may only impact or effect households in Alabama, and the households in Alabama may be virtually modeled or represented accordingly. The product rules may define the type and/or characteristics of the insurance products being offered by an insurance provider.

In one aspect, the present embodiments provide for virtual modeling of households (and the household or family members) for insurance-related purposes. The present embodiments may facilitate the role out of new products to verify their feasibility. For instance, virtual households may be used to test the impact of new insurance products and/or different insurance rates. Additionally or alternatively, a modular or uniform data structure may be used to represent or model the virtual households. A uniform data structure representing households may facilitate testing changes (e.g., changes in policies, premiums, rates, discounts, etc.); verifying or updating household insurance rating and/or other household information (e.g., people, names, number of vehicles or drivers, home address, etc.); and/or updating, adjusting, and/or generating insurance policies, premiums, discounts, etc. based upon information stored within or represented by a virtual household or model.

In another aspect, each virtual household may be self-contained for all products and lines of business, and provide a single, uniform data model for all products and lines of business. Data may be shared within a virtual household (or model) across all products and lines of business. As a result, products and lines of business for a virtual household are no longer isolated from each other within the virtual household. On the other hand, there may be no sharing of data outside of a virtual household, and virtual households may be isolated from each other.

Also, scoring and rating may be achieved more easily on a household basis using the virtual households or models. Real-time transactions, batch transactions, and/or a mixture of insurance, financial, or other transactions may be achieved more easily on a household basis. The present embodiments may also provide for massive concurrency and scalability.

While the systems and methods disclosed herein are well suited for personal insurance products or lines of business that have households of limited size, policies of limited numbers per household, and transactions of limited number per policy, the systems and methods may be applicable to other systems, products or lines of business such as mutual funds, banking products, commercial insurance products, etc.

I. Exemplary Prior Art Policy Administration System

FIG. 1 depicts an exemplary prior art policy administration system 100. The prior art system 100 is typically implemented as several monolithic systems, each of which is responsible for a product or line of business that an insurance company provides. As shown in FIG. 1, the insurance company may offer three different insurance products such as vehicle, home and life insurance. As such, the prior art system 100 may be implemented as three separate systems in which system 101 may be responsible for vehicle insurance, system 102 may be responsible for home insurance, and system 103 may be responsible for life insurance.

Various users 104 may interact with the systems 101-103 to shop, purchase, or service insurance products. In doing so, various transactions may be generated and processed by the systems 101-103. However, as FIG. 1 shows, each system only handles transactions that are related to its own product or line of business. For example, the system 101 only processes transactions related to vehicle insurance. While the systems 101-103 may be able to share certain data by accessing globally shared databases 105, 106, the systems 101-103 themselves are essentially isolated from one another. This makes the flow of data between the systems 101-103 difficult. As such, during the various transactions, separate processing operations may be needed to determine the impact, if any, of the various transactions on the different systems 101-103. Consequently, the performance of the overall system 100 may be rendered slow and/or inefficient.

II. Exemplary Policy Administration System Based Upon Finite State Machine Models To improve the performance of prior art or existing policy administration systems, a new design strategy based upon finite state machines may be used. Generally speaking, a finite state machine is a mathematical model for an abstract machine that can be in one of a finite number of states. A finite state machine is defined by a set of states, a set of events that operate on the states, and/or a set of transition functions that map the machine from one state to another when a triggering event is initiated. A finite state machine can be an effective tool to describe and develop systems targeted for the business domain. For example, a finite state machine may be used to model entities (e.g., customers, households, products, etc.) as well as transactions that are necessary for the creation and maintenance of these entities throughout their respective life cycles.

Figure 2:
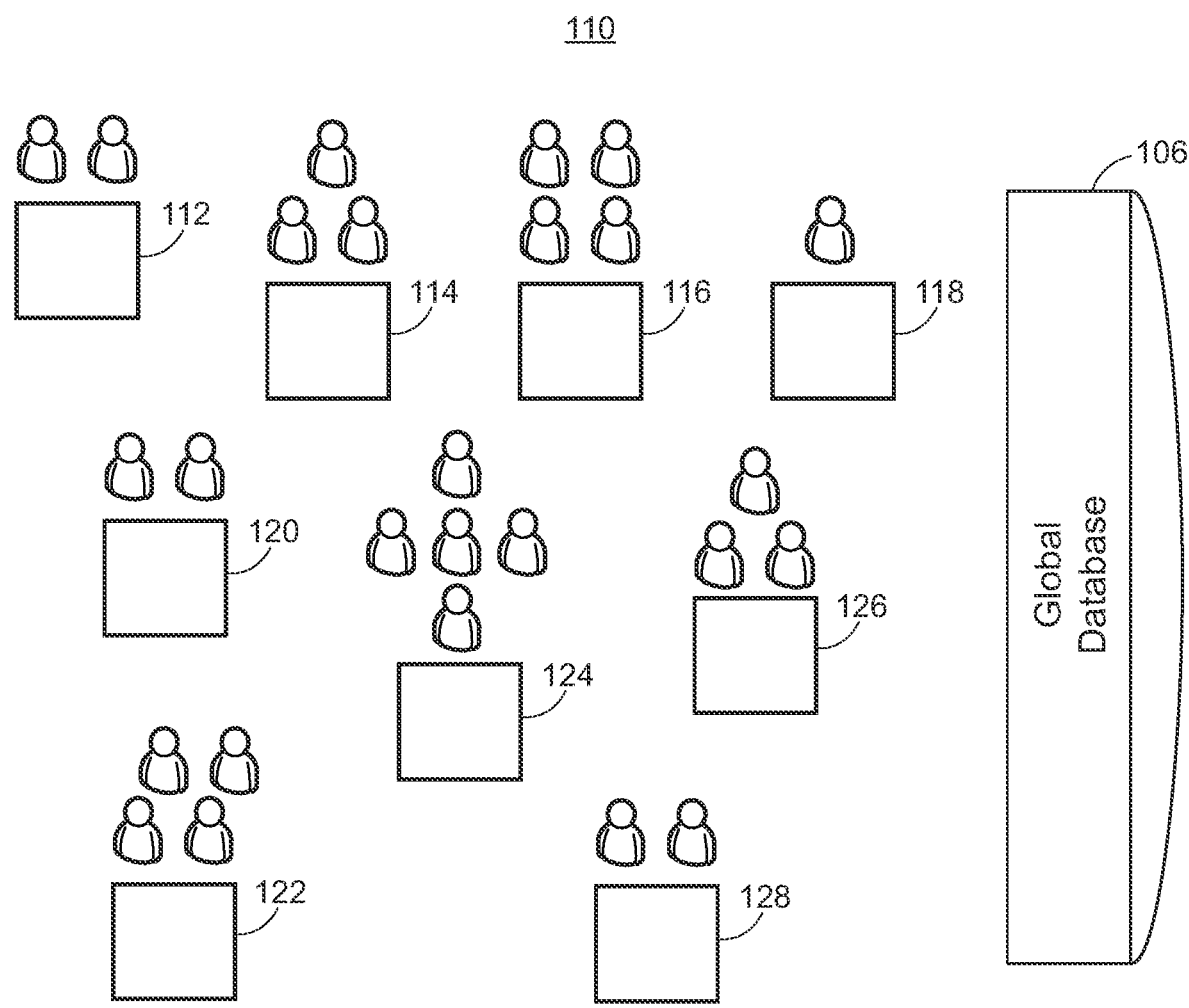
FIG. 2 is a block diagram of an exemplary policy administration system based upon finite state machine models.

FIG. 2 depicts an exemplary policy administration system 110 which is based upon finite state machine models. In particular, FIG. 2 shows the policy administration system 110 as comprised of a plurality of finite state machine-based households 112-128. Each of the households 112-128 may be defined by one or more states (e.g., data that describe or relate to the various policies associated with a household), one or more events (e.g., transactions that operate on the data), and/or one or more transition functions (e.g., transaction logics and product rules that govern how the transactions are processed).

A finite state machine-based household may serve as a single, uniform data model for all products or lines of business provided by an insurance company or the like. Accordingly, each of the households 112-128 may function as a type of self-contained policy administration system. This is in direct contrast to prior art policy administration systems where a separate monolithic system may exist for each product or line of business. Data and information within each of the households 112-128 may be shared across all products or lines of business. As a result, products or lines of business are no longer isolated from each other, and transactional impacts, if any, on the products or lines of business may be quickly and readily determined on a household basis.

Indeed, the system 110 may drastically improve the process by which insurance policies are administered (and/or managed, maintained, updated, adjusted, generated, etc.), at least in part by providing an efficient way to manage policies for various insurance products or lines of business concurrently on a household basis. In this manner, resource usage during transactions for all the households may be greatly improved. For example, instead of having to run separate processing operations for each product or line of business for all the households (as in the case of existing policy administration systems), the system 110 may process transactions concurrently and provide service to all the households in parallel. This in turn may improve system performance by reducing the total number of processor cycles needed.

As each of the households 112-128 represents a type of self-contained policy administration system, there is no sharing of data outside of a household. However, each of the households 112-128 may still obtain globally available data by accessing a globally shared database, such as the database 106 of FIG. 1.

Moreover, each of the households 112-128 may be dynamic in nature. That is, each of the households 112-128 may support dynamic functions such as split functions (e.g., breaking a single household into two or more households), merge functions (e.g., combining two or more households into a single household), upgrade or downgrade functions (e.g., accommodating new or old versions of data, transaction logics and product rules), backup functions, restore functions, and health check functions. The last three functions may be used for testing, maintenance and disaster recovery purposes.

Further, each of the households 112-128 may be upgraded asynchronously as needed. For example, a trigger to upgrade may be executed explicitly by a user's request for new business or by a request from a line of business due to compliance reasons. The trigger to upgrade may also be executed indirectly at a time of a policy renewal or by an asynchronous background maintenance job.

Still further, each of the households 112-128 may be easily versioned. That is, any upgrade or downgrade operation may be performed on a rolling basis or in phases. For example, a certain number of households (e.g., households 112-118) may be upgraded and tested first in a pilot program. If the pilot program is successful, then upgrades on the remaining households (e.g., households 120-128) may follow.

In addition, the households 112-128 of the system 110 may be batch processed. The batch processing of a particular household may be triggered as needed by transactions generated for that particular household. If there are no transactions for that household during a given day, then there is no batch processing for that particular household.

III. Exemplary Finite State Machine-Based Household

Figure 3:
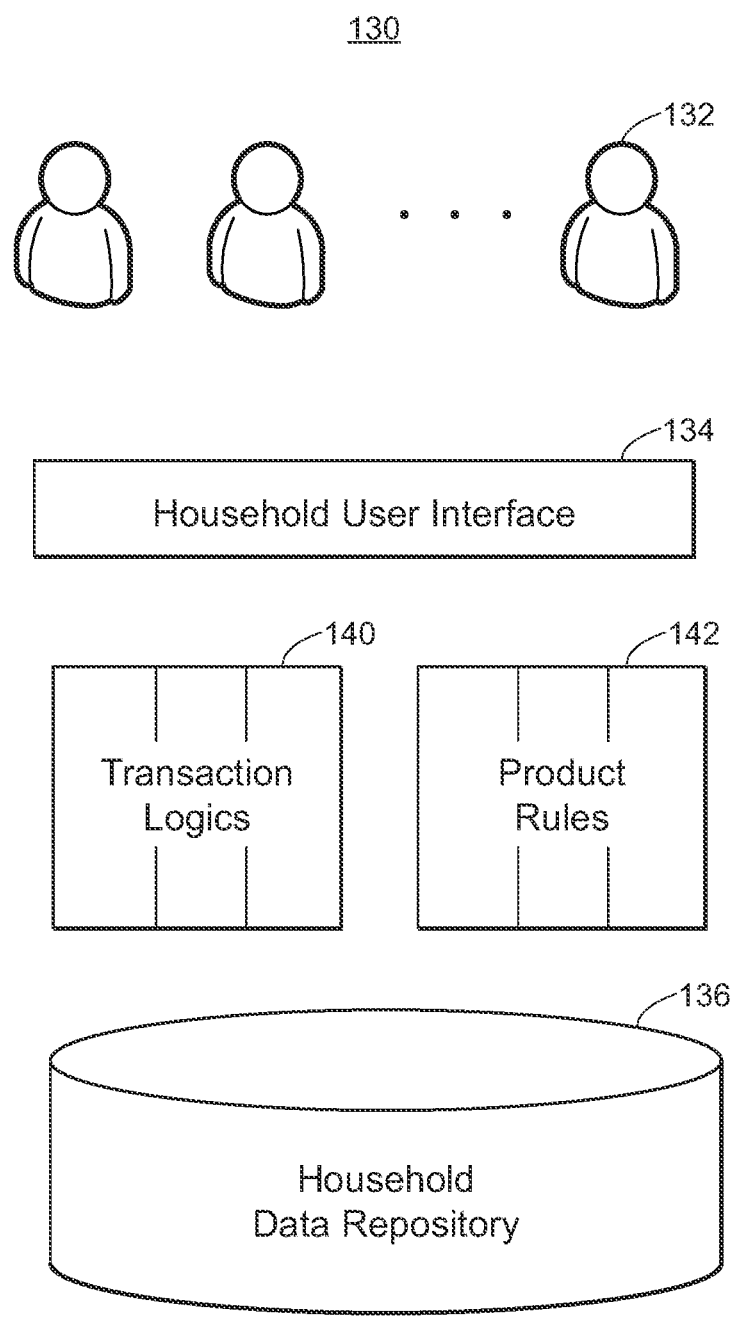
FIG. 3 is a block diagram of an exemplary finite state machine-based household.

FIG. 3 depicts an exemplary finite state machine-based household 130. The household 130 may represent any of the households 112-128 shown in FIG. 2. The household 130 may include one or more members 132. The total number of members (and pets) in the household 130 may vary according to planned or unplanned circumstances (e.g., members may join or leave the household due to personal needs, family needs, life events, etc.). For insurance purposes, individuals from an immediate or extended family, as well as pets or non-family individuals (e.g., roommates), may be considered as members of the household 130.

The household 130 may also include a household user interface 134 through which the one or more members 132 may create, view and manage insurance policies that are associated with the household 130 (e.g., vehicle insurance, home insurance, life insurance, health insurance, personal articles or personal belonging insurance, pet insurance, etc.). Additionally, other users (e.g., agents, underwriters, operations staff, etc.) may use the interface 134 (or another interface) to access the policies of the household 130. In an embodiment, the household user interface 134 may be versioned, immutable and enterprise global.

As the household 130 is modeled on a finite state machine, the household 130 is defined in terms of having one or more states, events, and/or transition functions. The states of the household 130 may be represented by data that describe or relate to the various policies of the household 130 (e.g., policy data that specify policy status, policy coverage, policy duration, etc.). The states (or data) of the household 130 may be stored in a household data repository 136.

The events of the household 130 are represented by transactions that operate on the states of the household 130 (i.e., transactions that operate on the data stored in the repository 136). The transactions may be external in nature, such as those initiated by users (e.g., the one or more members 132). Examples of external transactions may include a user creating a new policy, making changes to an existing policy, making a policy payment, renewing a policy, canceling a policy, etc. Additionally or alternatively, the transactions may be internal in nature, such as an automatic policy renewal.

In any event, once a transaction is generated and processed, the state of the household 130 may change. To illustrate this, consider a scenario where three types of policies are associated with the household 130. If a transaction is processed to cancel one of the policies, then the household 130 may undertake a transition from being in one state (e.g., having three policies) to being in another state (e.g., having only two policies).

The transition from one state to another is completed only if the conditions that define the transition are true. In other words, the processing of a transaction must conform to business logic and/or rules that govern how the transaction is to be processed. The transition functions of the household 130 correspond to these business rules and are represented in the form of transaction logics 140 and/or product rules 142. In an embodiment, the transaction logics 140 and product rules 142 may be versioned, immutable and/or enterprise global. Strict immutability and versioning of the transaction logics 140 and product rules 142 is necessary to ensure testability, maintainability and traceability of the business rules. On an enterprise level, the number of copies for the transaction logics 140 and product rules 142 may be equal to the number of active versions times the number of active servers.

In general, the transaction logics 140 may specify various actions that need to be performed or executed in order to process a transaction. For example, a particular transaction may involve adding a new driver to a vehicle insurance policy. Thus, the transaction logics 140 may indicate each and every execution step needed to process this particular transaction (e.g., a step to request the driver to enter a name, a step to verify that the driver's name is valid, a step to check the driver's driving record, etc.). The product rules 142 may specify guidelines that determine whether a transaction obeys a certain set of regulations as defined or required for a product or line of business. As such, a transaction may not be allowed if the transaction does not satisfy or meet the guidelines.

Continuing with the above example, the product rules 142 may indicate a guideline that stipulates a total number of drivers that may be included in the vehicle insurance policy. Accordingly, when processing the transaction, if adding the new driver entails exceeding the total number of drivers allowed, then the transaction is in violation of the guideline and therefore the transaction may not be completed as requested.

By fashioning the household 130 as a finite state machine, all of the states (or data) of the household 130, transaction logics 140 and product rules 142 may be stored locally (e.g., in the repository 136). This also allows the transaction logics 140 and product rules 142 to be easily deployed and cached.

In addition, this simplifies the process of deploying and upgrading to new transaction logics and product rules. For example, new transaction logics and product rules may be first tested and then pushed out concurrently to all the households on the enterprise level. Consequently, incremental delivery of business rules may be achieved by the continuous development, testing and deployment of the business rules in small and manageable chunks.

IV. Exemplary Workflow in a Finite State Machine-Based Household

Figure 4:
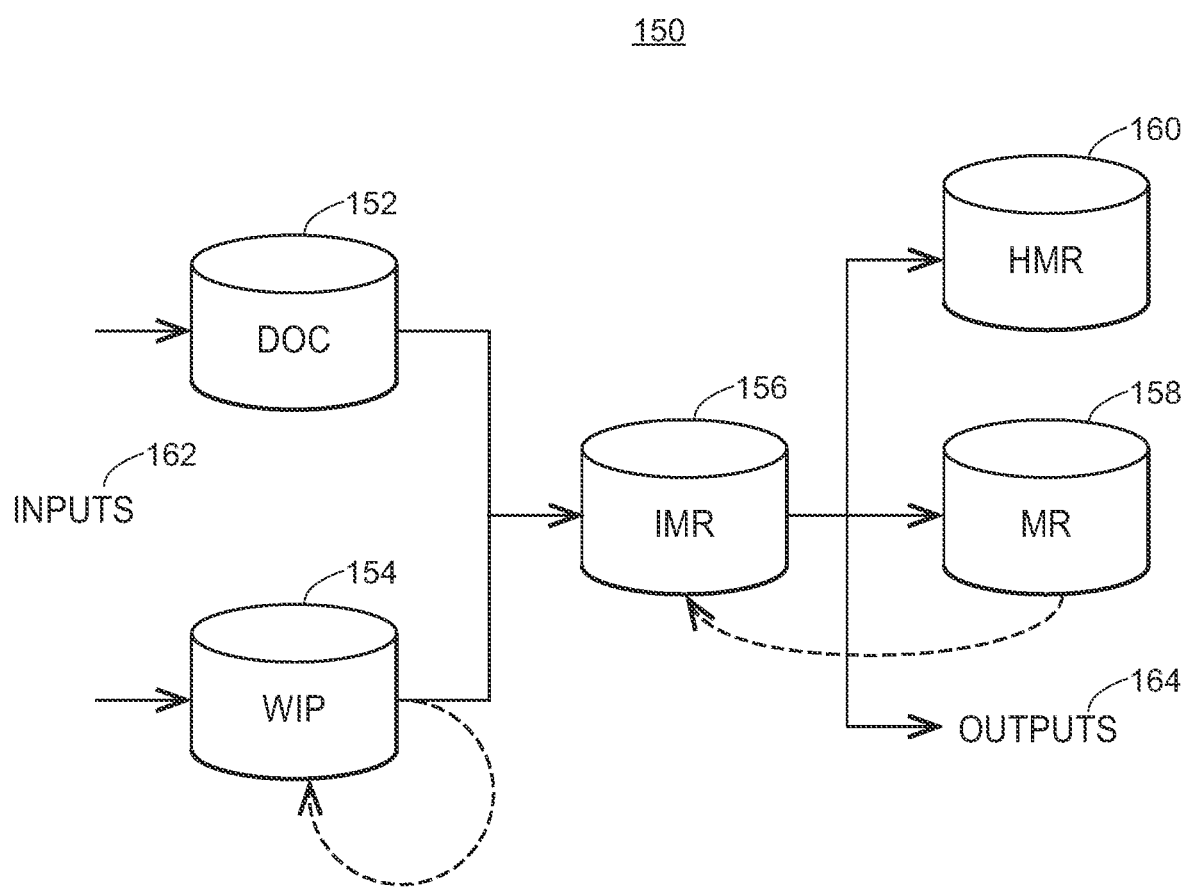
FIG. 4 is a block diagram of an exemplary workflow in a finite state machine-based household.

FIG. 4 depicts an exemplary workflow 150 in a finite state machine-based household. Generally speaking, the workflow 150 outlines the developmental flow for a policy. Accordingly, the workflow 150 may be partitioned into five broad stages: documents (DOC) 152, work in progress (WIP) 154, interim master records (IMR) 156, master records (MR) 158, and history of master records (HMR) 160.

To begin with, inputs 162 (e.g., personal information, profiles, preferences, etc.) may be entered into the DOC 152 and WIP 154 in order to initialize and also to build the policy. As such, the DOC 152 may include immutable supporting data for creating the policy (e.g., supporting documents such as policy applications, application requests, etc) Likewise, the WIP 154 may include mutable bookkeeping data for staging, reviewing, underwriting and servicing the policy. Results from the DOC 152 and WIP 154 are then fed into the IMR 156. The policy is held in the IMR 156 prior to finalization. Once finalized, the policy is moved to the MR 158. Changes to the MR 158 over time are recorded and reflected in the HMR 160. Further, outputs 164 may be generated from the policy, such as a printed insurance card, for example. Except for documents and histories, all data in the workflow 150 may be stored in a single container or memory location. Typically, data in the workflow 150 may not require caching.

In an embodiment, the stages 152-160 may be versioned and specific to a household. On an enterprise level, the number of copies for the stages 152-160 (not including any historical backups) may be equal to the number of active households times a configurable replication factor.

Figure 5:
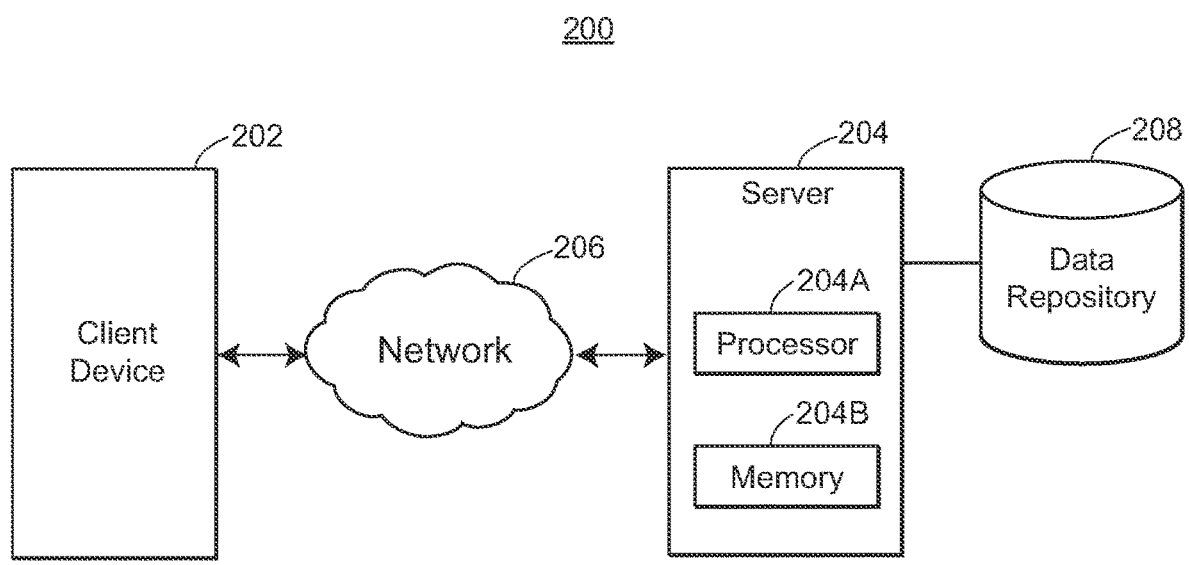
FIG. 5 is a block diagram of an exemplary system for developing policy administration systems based upon finite state machine models.

V. Exemplary System for Developing Policy Administration Systems Based Upon Finite State Machine Models FIG. 5 depicts an exemplary system 200 for developing policy administration systems based upon finite state machine models. The exemplary system 200 may include a client device 202 coupled to a server 204 via a communication network 206, which may include wired and/or wireless links. The client device 202 may be, for example, a mobile device (such as a smart phone, laptop, phablet, tablet, smart glasses, wearable electronics, smart watch or bracelet, etc.), a desktop computer, or other computing or mobile devices capable of sending and receiving data over the network 206.

The server 204 may be a single server or a plurality of servers with distributed processing. The server 204 may include a processor 204A and a memory 204B, and may be directly coupled to a data repository 208. In some embodiments, the repository 208 may not be directly coupled to the server 204, but instead may be accessible by the server 204 via a communication network, such as the network 206.

The server 204 may be owned or operated by an insurance company. A policy administration system based upon finite state machine models (similar to the system 110 of FIG. 2) may be designed and developed to manage insurance policies issued by the insurance company for various products or lines of business (e.g., vehicle insurance, home insurance, life insurance, health insurance, etc.). Similar to the system 110 of FIG. 2, the policy administration system may comprise a plurality of households that are insured by the insurance company.

The policy administration system may be implemented on the server 204. In particular, the processor 204A may execute instructions stored in the memory 204B to model each of the plurality of households as a finite state machine. Accordingly, each household may be defined by one or more states (e.g., data that describe or relate to the various policies associated with each household), one or more events (e.g., transactions that operate on the states (or data) of each household), and one or more transition functions (e.g., transaction logics and products rules that govern how the transactions are processed). Each finite state machine-based household may be similar to the household 130 of FIG. 3, for example.

Each finite state machine-based household may be saved in the data repository 208. Globally shared data (such as data available in the database 106 of FIG. 1) may also be saved in the repository 208. In some embodiments, globally shared data may be saved in another repository (not shown) that is either directly coupled to the server 204 or accessible by the server 204 via a communication network (e.g., the network 206).

Generally, a user may use the client device 202 to communicate with the server 204 to access the policy administration system (and hence individual households). To facilitate this interaction, each household may implement a user interface. The user interface may allow the user to access the various policies associated with each household, as well as allow the user to access all the products or lines of business provided by the insurance company. In some embodiments, a single, uniform user interface for end customers (e.g., policy holders or members of a household) may be implemented. In some embodiments, a single, uniform interface for company users (e.g., agents, underwriters, operations staff, etc.) may be implemented.

By realizing each household as a finite state machine, each household may function as a type of self-contained policy administration system. As such, real-time transactions, batch transactions and/or a mixture of transactions may be achieved more easily on a household basis. Further, insurance scoring and ratings may be achieved more easily on a household basis.

In general, a policy administration system with households based upon finite state machine models may be realized as a loosely coupled, high modularized architecture, which enables massive scalability. In an embodiment, the policy administration system may be realized as a massively scalable soft real-time system with Intel-based hardware running on a Linux operating system. With massive scalability, development and testing environments are inexpensive and easy to maintain. Mocking of internal systems and external systems for development and testing purposes is also simplified.

Figure 6:
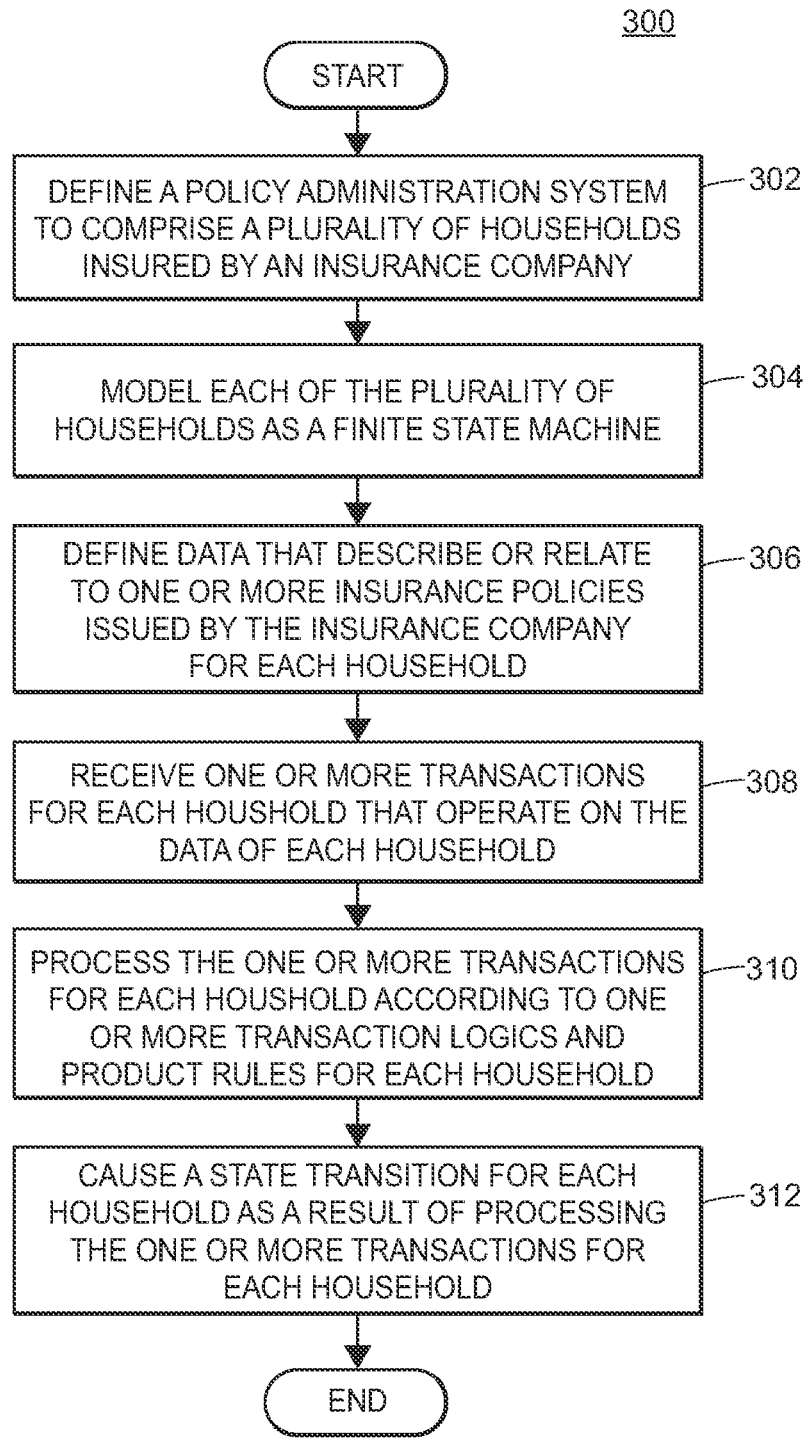
FIG. 6 is a flow diagram of an exemplary method for developing policy administration systems based upon finite state machine models.

VI. Exemplary Method for Developing Policy Administration Systems Based Upon Finite State Machine Models FIG. 6 depicts a flow diagram of an exemplary method 300 for developing policy administration systems based upon finite state machine models. The method 300 may include one or more blocks, routines or functions in the form of computer executable instructions that are stored in a tangible computer-readable memory (e.g., 204B of FIG. 5) and executed using a processor (e.g., 204A of FIG. 5).

The method 300 may begin by defining a policy administration system to comprise a plurality of households insured by an insurance company (block 302). The plurality of households may include at least a portion of all households insured by the insurance company. The insurance company may provide various products or lines of business (e.g., vehicle insurance, home insurance, health insurance, long-term care insurance, pet insurance, life insurance, etc.). The policy administration system may be similar to the system 110 of FIG. 2, for example.

Next, the method 300 may model each of the plurality of households as a finite state machine (block 304). As such, each of the plurality of households may be characterized or defined by a set of states, a set of events, and a set of transition functions. Each finite state machine-based household may be similar to the household 130 of FIG. 3, for example.

The method 300 then proceeds to define data that describe or relate to one or more insurance policies issued by the insurance company for each household (block 306). Here, the data correspond to the set of states for each household. The data may be any type of policy-related data (e.g., data that specify policy status, policy coverage, policy duration, etc.). The one or more insurance policies may be associated with the various products or lines of business provided by the insurance company, such as policies issued for vehicle insurance, home insurance, life insurance, umbrella insurance, health insurance, and/or other types of insurance, including personal insurance, individual insurance, family or household insurance, and/or insurance covering a households or household members.

The method 300 also receives one or more transactions for each household that operate on the data of each household (block 308). Here, the one or more transactions correspond to the set of events for each household. The one or more transactions may specify operations to create, lookup, modify, update, generate, terminate, cancel, renew, reinstate and/or service a given policy, and/or may relate to generating, updating, or adjusting insurance policies, premiums, rates, discounts, etc.

The method 300 then processes the one or more transactions for each household according to one or more transaction logics and product rules for each household (block 310). Here, the one or more transaction logics and product rules correspond to the set of transition functions for each household. The one or more transaction logics and product rules represent business rules that stipulate how the one or more transactions are to be processed. In particular, the transaction logics may specify various actions that need to be performed or executed in order to process a transaction. On the other hand, the product rules may specify guidelines that determine whether a transaction obeys a certain set of regulations as defined or required for a product or line of business.

Finally, the method 300 may cause a state transition for each household as a result of processing the one or more transactions for each household (block 312). More particularly, causing the state transition may entail causing a household to undertake a change from a first state to a second state. The first state indicates the state of the data of each household before the processing of the one or more transactions and the second state indicates the state of the data of each household after the processing of the one or more transactions. For example, a transaction may modify the coverage of a particular home insurance policy associated with a household. Thus, as a result of processing the transaction, the household may undertake a change from being in a first state (e.g., having an old coverage on the policy) to being in a second state (e.g., having a new coverage on the policy).

VII. Exemplary Method

In one aspect, a computer-implemented method for developing a policy administration system based upon finite state machine models may be provided. The method may include (1) defining, by one or more processors executing a processor-implemented instruction module, the policy administration system to comprise a plurality of households insured by an insurance company where the plurality of households may include at least a portion of all households insured by the insurance company; (2) modeling, by the processor-implemented instruction module, each of the plurality of households as a finite state machine, wherein each of the plurality of households is defined by a (i) set of states, (ii) a set of events, and/or (iii) a set of transition functions; (3) defining, by the processor-implemented instruction module, data that describe or relate to one or more insurance policies issued by the insurance company for each household, the data corresponding to the set of states for each household; (4) receiving, by the processor-implemented instruction module, one or more transactions for each household that operate on the data of each household, the one or more transactions corresponding to the set of events for each household; (5) processing, by the processor-implemented instruction module, the one or more transactions for each household according to one or more transaction logics and/or one or more product rules for each household, the one or more transaction logics and product rules corresponding to the set of transition functions for each household; and/or (6) causing, by the processor-implemented instruction module, a state transition for each household as a result of processing the one or more transactions for each household to facilitate managing, administering, updating, and/or generating insurance policies. The method may include additional, fewer, or alternate actions, including those discussed elsewhere herein.

Causing the state transition may further include causing each household to undertake a change from a first state to a second state, where the first state may indicate the state of the data of each household before the processing of the one or more transactions and the second state may indicate the state of the data of each household after the processing of the one or more transactions.

The one or more insurance policies may be issued for products or lines of business provided by the insurance company including one or more of a vehicle insurance, home insurance, health insurance, long-term care insurance, pet insurance, or life insurance.

The one or more transactions may specify one or more operations that create, lookup, modify, terminate, cancel, renew, reinstate or service a policy. For instance, the one or more operations may include adjusting, updating, and/or generating an insurance policy, premium, rate, or discount. Further, the one or more transaction logics may specify actions that need to be executed in order to process a transaction, and/or the one or more product rules may specify guidelines that determine whether a transaction obeys a set of regulations as defined or required for a product or line of business.

Each of the plurality of households may support dynamic functions including one or more of a split function, merge function, upgrade or downgrade function, backup function, restore function, and/or heath check function. Each of the plurality of households may also implement a user interface that allows a user to access the one or more insurance policies associated with each household, as well as the products or lines of business provided by the insurance company. Additionally, the data, the one or more transaction logics and/or the one or more product rules of each household may be stored locally in each household.

VIII. Exemplary Computer System

In one aspect, a computer system for developing a policy administration system based upon finite state machine models may be provided. The computer system may include a data repository and a server, including a memory having instructions for execution on one or more processors. The instructions, when executed by the one or more processors, may cause the server to define, by one or more processors executing one or more processor-implemented instruction modules, the policy administration system to comprise a plurality of households insured by an insurance company where the plurality of households may include at least a portion of all households insured by the insurance company; model, by the one or more processors executing one or more processor-implemented instruction modules, each of the plurality of households as a finite state machine, wherein each of the plurality of households is defined by a (i) set of states, (ii) a set of events, and/or (iii) a set of transition functions; store, by the one or more processors executing one or more processor-implemented instruction modules, each household in the data repository; define, by the one or more processors executing one or more processor-implemented instruction modules, data that describe or relate to one or more insurance policies issued by the insurance company for each household, the data corresponding to the set of states for each household; receive, via a network connection, one or more transactions for each household that operate on the data of each household, the one or more transactions corresponding to the set of events for each household; process, by the one or more processors executing one or more processor-implemented instruction modules, the one or more transactions for each household according to one or more transaction logics and one or more product rules for each household, the one or more transaction logics and product rules corresponding to the set of transition functions for each household; and/or cause, by the one or more processors executing one or more processor-implemented instruction modules, a state transition for each household as a result of processing the one or more transactions for each household. The computer system may include additional, less, or alternate components, including those discussed elsewhere herein.

The instructions of the server, when executed by the one or more processors to cause the state transition may further include instructions to causing each household to undertake a change from a first state to a second state, where the first state may indicate the state of the data of each household before the processing of the one or more transactions and the second state may indicate the state of the data of each household after the processing of the one or more transactions.

The one or more transactions may specify one or more operations that create, lookup, modify, terminate, cancel, renew, reinstate or service a policy. For instance, the one or more operations, may include adjusting, updating, and/or generating an insurance policy, premium, rate, and/or discount. Further, the one or more transaction logics may specify actions that need to be executed in order to process a transaction, and the one or more product rules may specify guidelines that determine whether a transaction obeys a set of regulations as defined or required for a product or line of business.

Each of the plurality of households may be configured to support dynamic functions including one or more of a split function, merge function, upgrade or downgrade function, backup function, restore function, and/or heath check function. Each of the plurality of households may also be configured to implement a user interface to allow a user to access the one or more insurance policies associated with each household as well as the products or lines of business provided by the insurance company. Additionally, the data, the one or more transaction logics and the one or more product rules of each household may be stored locally in each household.

IX. Exemplary Non-Transitory Storage Medium

In one aspect, a non-transitory computer-readable storage medium including computer-readable instruction may be executed on one or more processors for developing a policy administration system based upon finite state machine models. The instructions, when executed, may cause the one or more processors to define, by a processor-implemented instruction module, the policy administration system to comprise a plurality of households insured by an insurance company where the plurality of households may include at least a portion of all households insured by the insurance company; model, by the processor-implemented instruction module, each of the plurality of households as a finite state machine, wherein each of the plurality of households is defined by a (i) set of states, (ii) a set of events, and/or (iii) a set of transition functions; define, by the processor-implemented instruction module, data that describe or relate to one or more insurance policies issued by the insurance company for each household, the data corresponding to the set of states for each household; receive, by the processor-implemented instruction module, one or more transactions for each household that operate on the data of each household, the one or more transactions corresponding to the set of events for each household; process, by the processor-implemented instruction module, the one or more transactions for each household according to one or more transaction logics and one or more product rules for each household, the one or more transaction logics and product rules corresponding to the set of transition functions for each household; and/or cause, by the processor-implemented instruction module, a state transition for each household as a result of processing the one or more transactions for each household.

The instructions, when executed on the one or more processors to cause the state transition may further include instructions to cause each household to undertake a change from a first state to a second state, where the first state may indicate the state of the data of each household before the processing of the one or more transactions and the second state may indicate the state of the data of each household after the processing of the one or more transactions. The instructions may direct or control additional, less, or alternate functionality, including that discussed elsewhere herein.

The one or more transactions may specify one or more operations that create, lookup, modify, terminate, cancel, renew, reinstate or service a policy, and/or adjust or generate insurance policies, premiums, rates, and/or discounts. Further, the one or more transaction logics may specify actions that need to be executed in order to process a transaction, and the one or more product rules may specify guidelines that determine whether a transaction obeys a set of regulations as defined or required for a product or line of business.

Each of the plurality of households may support dynamic functions including one or more of a split function, merge function, upgrade or downgrade function, backup function, restore function or heath check function.

X. Exemplary Computing Environment

Figure 7:
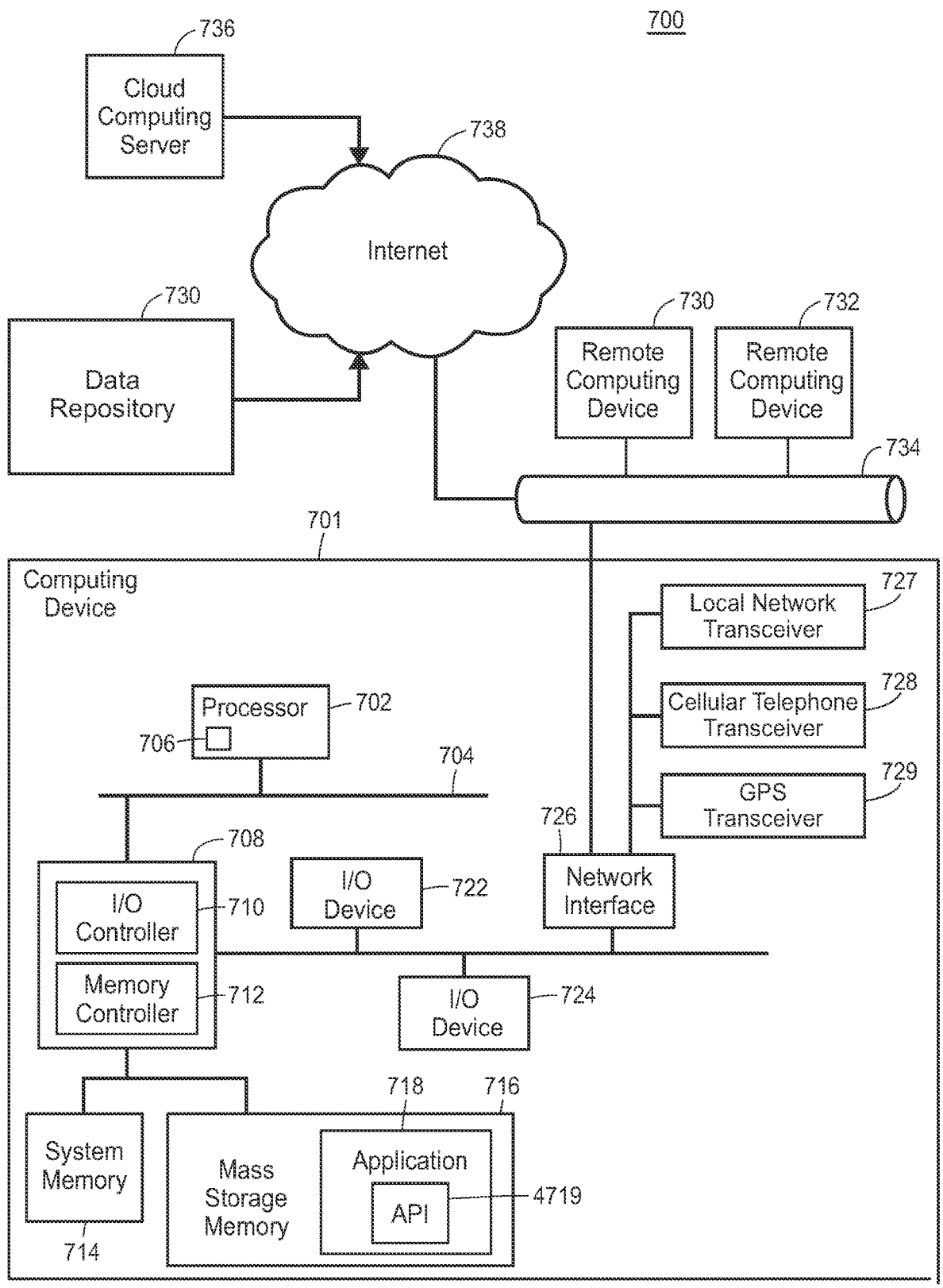
FIG. 7 is a block diagram of an exemplary computing environment that implements a system and method for developing policy administration systems based upon finite state machine models.

FIG. 7 is a block diagram of an exemplary computing environment for a system 700 having a computing device 701 that may be used to implement the systems and methods described herein. The computing device 701 may be a computing or mobile device (e.g., a smart phone, a tablet computer, a laptop computer, a Wi-Fi-enabled device, etc.), a server, or other types of computing or mobile devices. Processor systems similar or identical to the system 700 may be used to implement and execute the exemplary system of FIG. 5, the exemplary method of FIG. 6, and the like. Although the system 700 is described below as including a plurality of peripherals, interfaces, chips, memories, etc., one or more of those elements may be omitted from other exemplary processor systems used to implement and execute the exemplary system 200. Also, other components may be added.

As shown in FIG. 7, the computing device 701 may include a processor 702 that is coupled to an interconnection bus 704. The processor 702 may include a register set or register space 706, which is depicted in FIG. 7 as being entirely on-chip, but which could alternatively be located entirely or partially off-chip and directly coupled to the processor 702 via dedicated electrical connections and/or via the interconnection bus 704. The processor 702 may be any suitable processor, processing unit or microprocessor. Although not shown in FIG. 7, the computing device 701 may be a multi-processor device and, thus, may include one or more additional processors that are identical or similar to the processor 702 and that are communicatively coupled to the interconnection bus 704.

The processor 702 of FIG. 7 may be coupled to a chipset 708, which may include a memory controller 710 and a peripheral input/output (I/O) controller 712. As is well known, a chipset typically provides I/O and memory management functions, as well as a plurality of general purpose and/or special purpose registers, timers, etc. that are accessible or used by one or more processors coupled to the chipset 708. The memory controller 710 may perform functions that enable the processor 702 (or processors if there are multiple processors) to access a system memory 714 and a mass storage memory 716, that may include either or both of an in-memory cache (e.g., a cache within the memory 414) or an on-disk cache (e.g., a cache within the mass storage memory 716).

The system memory 714 may include any desired type of volatile and/or non-volatile memory such as, for example, static random access memory (SRAM), dynamic random access memory (DRAM), flash memory, read-only memory (ROM), etc. The mass storage memory 716 may include any desired type of mass storage device. For example, if the computing device 701 is used to implement an application 718 having an API 719 (including functions and instructions as described by the method 300 of FIG. 6), the mass storage memory 716 may include a hard disk drive, an optical drive, a tape storage device, a solid-state memory (e.g., a flash memory, a RAM memory, etc.), a magnetic memory (e.g., a hard drive), or any other memory suitable for mass storage.

As used herein, the terms module, block, function, operation, procedure, routine, step, and method refer to tangible computer program logic or tangible computer executable instructions that provide the specified functionality to the computing device 701 and the system 700. Thus, a module, block, function, operation, procedure, routine, step, and method may be implemented in hardware, firmware, and/or software. In one embodiment, program modules and routines (e.g., the application 718, the API 719, etc.) are stored in mass storage memory 716, loaded into system memory 714, and executed by a processor 702 or may be provided from computer program products that are stored in tangible computer-readable storage mediums (e.g., RAM, hard disk, optical/magnetic media, etc.).

The peripheral I/O controller 710 may perform functions that enable the processor 702 to communicate with peripheral input/output (I/O) devices 722 and 724, a network interface 726, a local network transceiver 727, a cellular network transceiver 728, and/or a GPS transceiver 729 via the network interface 726. The I/O devices 722 and 724 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The cellular telephone transceiver 728 may be resident with the local network transceiver 727. The local network transceiver 727 may include support for a Wi-Fi network, Bluetooth, Infrared, or other wireless data transmission protocols.

In other embodiments, one element may simultaneously support each of the various wireless protocols employed by the computing device 701. For example, a software-defined radio may be able to support multiple protocols via downloadable instructions. In operation, the computing device 701 may be able to periodically poll for visible wireless network transmitters (both cellular and local network) on a periodic basis. Such polling may be possible even while normal wireless traffic is being supported on the computing device 701. The network interface 726 may be, for example, an Ethernet device, an asynchronous transfer mode (ATM) device, an 802.11 wireless interface device, a DSL modem, a cable modem, a cellular modem, etc., that enables the system 700 to communicate with another computer system having at least the elements described in relation to the system 200.

While the memory controller 712 and the I/O controller 710 are depicted in FIG. 7 as separate functional blocks within the chipset 708, the functions performed by these blocks may be integrated within a single integrated circuit or may be implemented using two or more separate integrated circuits. The system 700 may also implement the application 718 on remote computing devices 730 and 732. The remote computing devices 730 and 732 may communicate with the computing device 701 over an Ethernet link 734.

In some embodiments, the application 718 may be retrieved by the computing device 701 from a cloud computing server 736 via the Internet 738. When using the cloud computing server 736, the retrieved application 718 may be programmatically linked with the computing device 701. The application 718 may be a Java® applet executing within a Java® Virtual Machine (JVM) environment resident in the computing device 701 or the remote computing devices 730, 732. The application 718 may also be "plug-ins" adapted to execute in a web-browser located on the computing devices 701, 730, and 732. In some embodiments, the application 718 may communicate with backend components 740 such as the data repository 208 via the Internet 738.

The system 700 may include, but is not limited to, any combination of a LAN, a MAN, a WAN, a mobile, a wired or wireless network, a private network, or a virtual private network. Moreover, while only two remote computing devices 730 and 732 are illustrated in FIG. 7 to simplify and clarify the description, it is understood that any number of client computers are supported and may be in communication within the system 700.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the Figures depict preferred embodiments of a system and method for developing policy administration systems based upon finite state machine models for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for developing policy administration systems based upon finite state machine models through the disclosed principles herein. Thus, while particular embodiments and applications have been illustrated and described, it is to be understood that the disclosed embodiments are not limited to the precise construction and components disclosed herein. Various modifications, changes and variations which will be apparent to those skilled in the art, may be made in the arrangement, operation and details of the method and apparatus disclosed herein without departing from the spirit and scope defined in the appended claims.

What is claimed:

1. A computer-implemented method for developing a policy administration system based upon finite state machine models, the method comprising:
defining, by one or more processors, the policy administration system to comprise a plurality of households insured by an insurance company, wherein the plurality of households includes at least a portion of all households insured by the insurance company;

modeling, by the one or more processors, each of the plurality of households as a finite state machine, wherein each of the plurality of households is defined by (i) a set of states, (ii) a set of events, and (iii) a set of transition functions;

defining, by the one or more processors, data that describe or relate to one or more insurance policies issued by the insurance company for each household, the data corresponding to the set of states for each household;

receiving, by the one or more processors, one or more transactions for each household that operate on the data of each household, the one or more transactions corresponding to the set of events for each household;

processing, by the one or more processors, the one or more transactions for each household according to one or more transaction logics and one or more product rules for each household, the one or more transaction logics and product rules corresponding to the set of transition functions for each household; and causing, by the one or more processors, a state transition for each household as a result of processing the one or more transactions for each household to facilitate managing, updating, and/or generating insurance policies.

2. The computer-implemented method of claim 1, wherein causing the state transition includes causing each household to undertake a change from a first state to a second state, the first state indicating the state of the data of each household before the processing of the one or more transactions and the second state indicating the state of the data of each household after the processing of the one or more transactions.

3. The computer-implemented method of claim 1, wherein the one or more insurance policies are issued for products or lines of business provided by the insurance company including one or more of a vehicle insurance, home insurance, health insurance, long-term care insurance, pet insurance, or life insurance.

4. The computer-implemented method of claim 1, wherein the one or more transactions specify one or more operations that create, lookup, modify, terminate, cancel, renew, reinstate or service a policy.

5. The computer-implemented method of claim 1, wherein the one or more transaction logics specify actions that need to be executed in order to process a transaction, and the one or more product rules specify guidelines that determine whether a transaction obeys a set of regulations as defined or required for a product or line of business.

6. The computer-implemented method of claim 1, wherein each of the plurality of households supports dynamic functions including one or more of a split function, merge function, upgrade or downgrade function, backup function, restore function or heath check function.

7. The computer-implemented method of claim 1, wherein each of the plurality of households implements a user interface that allows a user to access the one or more insurance policies associated with each household as well as the products or lines of business provided by the insurance company.

8. The computer-implemented method of claim 1, wherein the data, the one or more transaction logics and the one or more product rules of each household are stored locally in each household.

9. A non-transitory computer-readable storage medium including computer-readable instruction to be executed on one or more processors of a system for developing a policy administration system based upon finite state machine models, the instructions when executed causing the one or more processors to:

define, by one or more processors, the policy administration system to comprise a plurality of households insured by an insurance company, wherein the plurality of households includes at least a portion of all households insured by the insurance company;

model, by the one or more processors, each of the plurality of households as a finite state machine, wherein each of the plurality of households is defined by (i) a set of states, (ii) a set of events, and (iii) a set of transition functions;

define, by the one or more processors, data that describe or relate to one or more insurance policies issued by the insurance company for each household, the data corresponding to the set of states for each household;

receive, by the one or more processors, one or more transactions for each household that operate on the data of each household, the one or more transactions corresponding to the set of events for each household;

process, by the one or more processors, the one or more transactions for each household according to one or more transaction logics and one or more product rules for each household, the one or more transaction logics and product rules corresponding to the set of transition functions for each household; and cause, by the one or more processors, a state transition for each household as a result of processing the one or more transactions for each household to facilitate managing, updating, and/or generating insurance policies.

10. The non-transitory computer-readable storage medium of claim 9, wherein the instructions to cause the state transition include causing each household to undertake a change from a first state to a second state, the first state indicating the state of the data of each household before the processing of the one or more transactions and the second state indicating the state of the data of each household after the processing of the one or more transactions.

11. The non-transitory computer-readable storage medium of claim 9, wherein the one or more transactions specify one or more operations that create, lookup, modify, terminate, cancel, renew, reinstate or service a policy.

12. The non-transitory computer-readable storage medium of claim 9, wherein the one or more transaction logics specify actions that need to be executed in order to process a transaction, and the one or more product rules specify guidelines that determine whether a transaction obeys a set of regulations as defined or required for a product or line of business.

13. The non-transitory computer-readable storage medium of claim 9, wherein each of the plurality of households supports dynamic functions including one or more of a split function, merge function, upgrade or downgrade function, backup function, restore function or heath check function.

14. A computer system for developing a policy administration system based upon finite state machine models, the system comprising:

a data repository; and a server, including a memory having instructions for execution on one or more processors, wherein the instructions, when executed by the one or more processors, cause the server to:

define, by one or more processors, the policy administration system to comprise a plurality of households insured by an insurance company, wherein the plurality of households includes at least a portion of all households insured by the insurance company;

model, by the one or more processors, each of the plurality of households as a finite state machine, wherein each of the plurality of households is defined by (i) a set of states, (ii) a set of events, and (iii) a set of transition functions;

store, by the one or more processors, each household in the data repository;

define, by the one or more processors, data that describe or relate to one or more insurance policies issued by the insurance company for each household, the data corresponding to the set of states for each household;

receive, via a network connection, one or more transactions for each household that operate on the data of each household, the one or more transactions corresponding to the set of events for each household;

process, by the one or more processors, the one or more transactions for each household according to one or more transaction logics and one or more product rules for each household, the one or more transaction logics and product rules corresponding to the set of transition functions for each household; and cause, by the one or more processors, a state transition for each household as a result of processing the one or more transactions for each household to facilitate managing, updating, and/or generating insurance policies.

15. The computer system of claim 14, wherein the instructions of the server, when executed by the one or more processors to cause the state transition include instructions to cause each household to undertake a change from a first state to a second state, the first state indicating the state of the data of each household before the processing of the one or more transactions and the second state indicating the state of the data of each household after the processing of the one or more transactions.

16. The computer system of claim 14, wherein the one or more transactions specify one or more operations that create, lookup, modify, terminate, cancel, renew, reinstate or service a policy.

17. The computer system of claim 14, wherein the one or more transaction logics specify actions that need to be executed in order to process a transaction, and the one or more product rules specify guidelines that determine whether a transaction obeys a set of regulations as defined or required for a product or line of business.

18. The computer system of claim 14, wherein each of the plurality of households is configured to support dynamic functions including one or more of a split function, merge function, upgrade or downgrade function, backup function, restore function or heath check function.

19. The computer system of claim 14, wherein each of the plurality of households is configured to implement a user interface to allow a user to access the one or more insurance policies associated with each household as well as the products or lines of business provided by the insurance company.

20. The computer system of claim 14, wherein the data, the one or more transaction logics and the one or more product rules of each household are stored locally in each household.

* * * * *